United States Patent [19]

Monty et al.

[11] Patent Number: 5,123,248
[45] Date of Patent: Jun. 23, 1992

[54] LOW EMISSIONS COMBUSTOR

[75] Inventors: Joseph D. Monty, Boxford; Thomas G. Hill, Lynnfield; Jacob S. Hoffman, Ipswich, all of Mass.

[73] Assignee: General Electric Company, Lynn, Mass.

[21] Appl. No.: 501,071

[22] Filed: Mar. 28, 1990

[51] Int. Cl.$^5$ ............................ F02C 1/00; F02G 3/00
[52] U.S. Cl. ........................................ 60/740; 60/748; 60/752; 60/754; 60/755
[58] Field of Search ................ 60/740, 748, 752, 753, 60/755, 757, 754

[56] References Cited

U.S. PATENT DOCUMENTS

| 3,899,884 | 8/1975 | Ekstedt | 60/39.74 |
| 3,946,552 | 3/1976 | Weinstein et al. | 60/748 |
| 3,972,182 | 8/1976 | Salvi | 60/39.74 |
| 3,978,662 | 10/1976 | DuBell et al. | 60/39.65 |
| 4,248,940 | 2/1981 | Goward et al. | 428/633 |
| 4,265,085 | 5/1981 | Fox et al. | 60/39.06 |
| 4,555,901 | 12/1985 | Wakeman et al. | 60/39.32 |
| 4,584,834 | 4/1986 | Koshoffer et al. | 60/737 |
| 4,916,906 | 4/1991 | Vogt | 60/757 |

OTHER PUBLICATIONS

Northern Research and Engineering Corporation (NREC), "The Design and Development of Gas Turbine Combustors", vol. I, 1980, Cover page and pp. iii, 3.1–3.5, 3.28–3.31, 3.40, 5.1–5.3, 5.14–5.15, 5.88, 7.1, 7.2, 7.65, and vol. II: Cover page and pp. 4.8, 4.9, and 4.31.
T. G. Hill et al., "Analytical Fuel Property Effects—Small Combustors", NASA CR-174848, Mar. 1985.

Primary Examiner—Richard A. Bertsch
Assistant Examiner—Howard R. Richman
Attorney, Agent, or Firm—Jerome C. Squillaro; Nathan D. Herkamp

[57] ABSTRACT

A combustor effective for reducing exhaust emissions is disclosed. The combustor includes first and second liners defining a primary combustion zone, and a plurality of circumferentially spaced carburetors. Each of the carburetors includes a fuel injector providing fuel into an air swirler for mixing the air and fuel and providing a fuel/air mixture into the combustor primary zone. The combustor also includes means for obtaining a fuel distribution from each of the carburetors extending radially from a first liner upstream end through a center region of the combustor to a second liner upstream end with values of the fuel distribution at the center region being generally no greater than about values of the fuel distribution adjacent to at least one of the first and second liners. The first and second liners have upstream portions characterized by the absence of film cooling thereof.

25 Claims, 6 Drawing Sheets

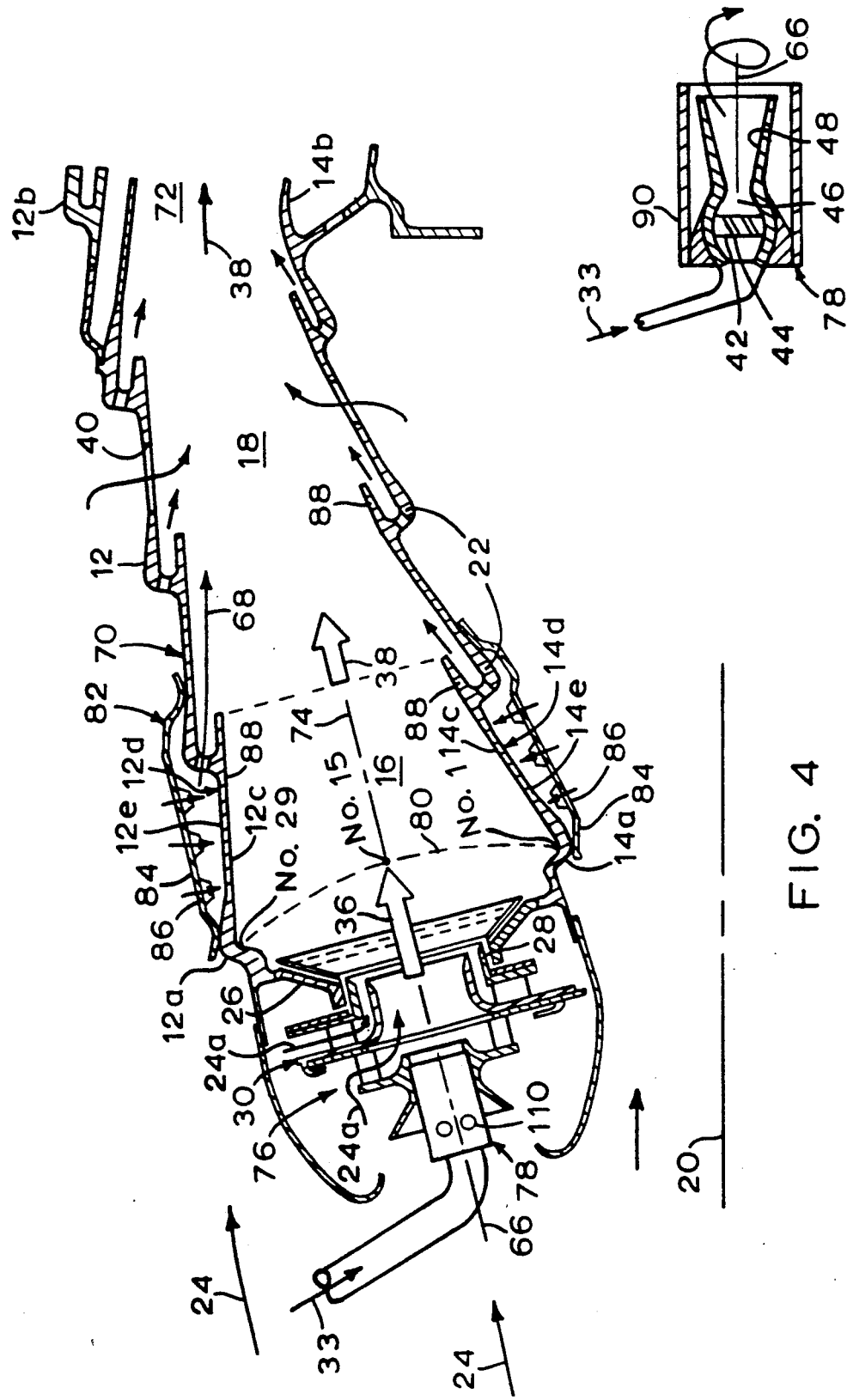

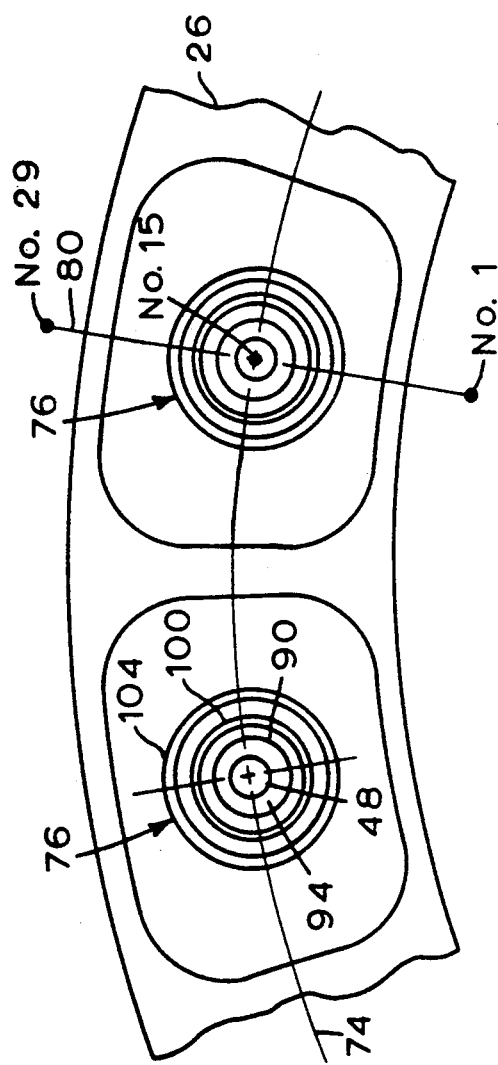
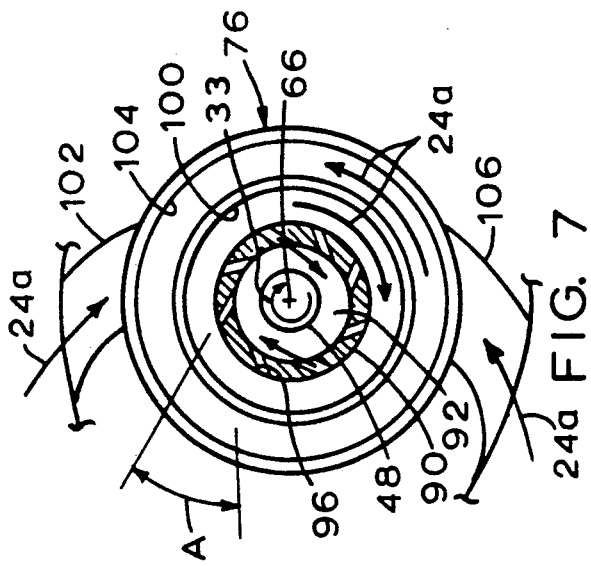
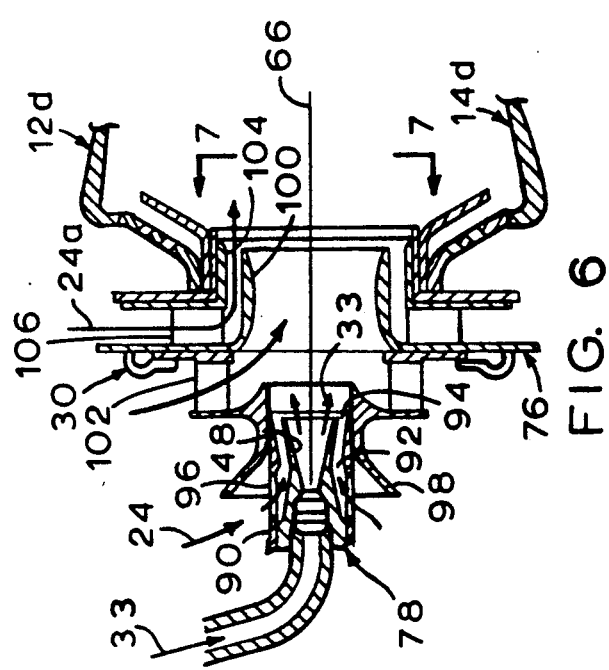

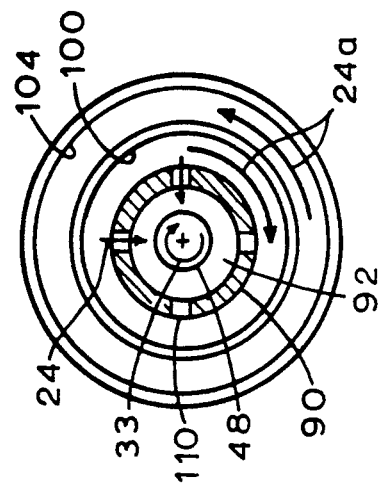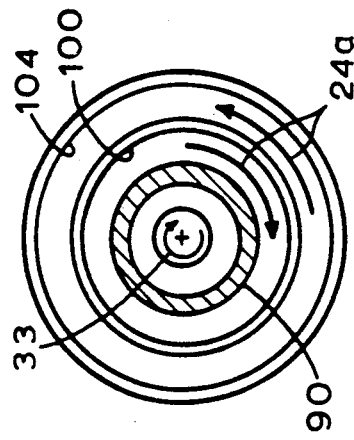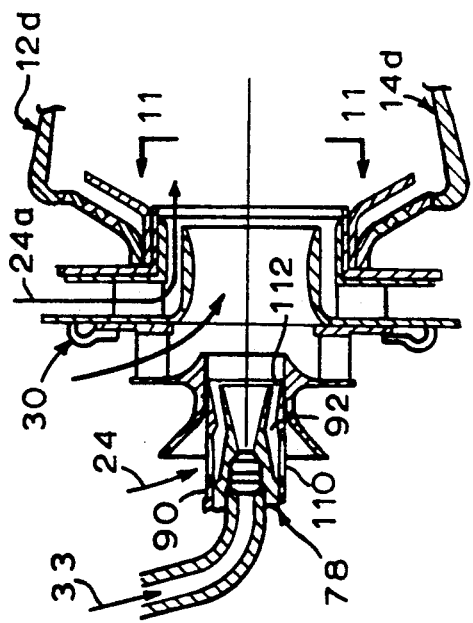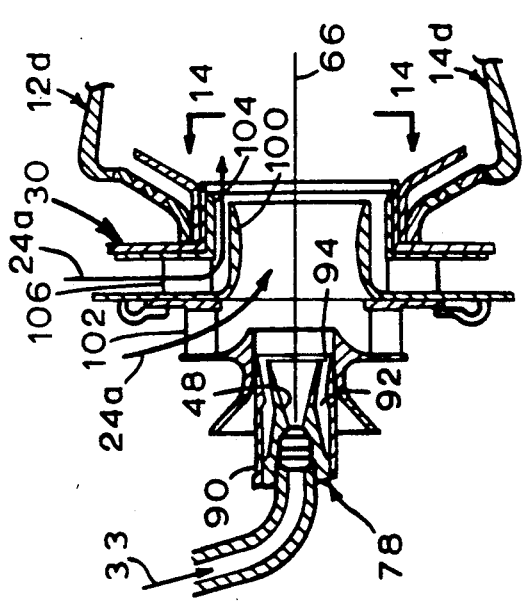

LOW EMISSIONS COMBUSTOR

TECHNICAL FIELD

The present invention relates generally to gas turbine engine combustors, and, more specifically, to an improved combustor having means for reducing exhaust emissions thereof.

BACKGROUND ART

Commercial aircraft gas turbine engines must meet certain federally-mandated smoke and emissions requirements. For example the Federal Aviation Administration (FAA) has a regulation which limits the amount of unburned hydrocarbon emissions including smoke and vapor forms thereof. Furthermore, the International Civil Aeronautics Organization (ICAO) also places limits on emissions including unburned hydrocarbons, oxides of nitrogen and carbon monoxide.

The prior art includes various means for reducing gas turbine engine exhaust emissions including improved carburetors to more fully mix and atomize fuel and air for obtaining more complete combustion. It is known that unburned hydrocarbons will result when combustion, or reaction, process occurs at less than about 1500° F., whereas complete burning of hydrocarbons will occur at reaction temperatures greater than about 2000° F., with reaction temperatures therebetween resulting in varying amounts of hydrocarbons.

However, the combustion process generates such high temperatures in a gas turbine engine combustor that unless the combustor itself is adequately cooled, conventional metallic alloys used in fabricating the combustor will suffer severe thermal distress. Accordingly, conventional gas turbine engines employ means for film cooling the combustor liner to protect the liner from high temperature combustion gases. U.S. Pat. No. 3,978,662—DuBell et al, assigned to the present assignee, discloses several means for providing effective film cooling of a combustor liner. The cooling fluid used for film cooling in a gas turbine engine is compressor discharge air which has a typical temperature of about 1000° F. at rated power, but only 350–400° F. at idle, where most emissions are formed.

The use of a low temperature boundary layer, or film of cooling air along the entire inner surface of a combustor liner provides for effective cooling of the liner from the hot combustion gases. However, since the temperature of that boundary layer is about the temperature of the cooling air, which is substantially less than about 1500° F., quenching, or cooling, of the fuel/air mixture against that boundary layer will occur during operation. Since combustion of the quenched fuel/air mixture along the cooling air boundary layer will therefore occur at temperatures much less than about 1500° F., unburned hydrocarbons and carbon monoxide will be generated.

Prior art combustors typically include carburetors effective for obtaining a fuel-rich center region in the primary combustion zone which has generally short combustor residence time as well as having relatively low recirculation of the fuel/air mixture. This is typically done for preventing entrainment of unburned fuel in the cooling film with resultant quenching of the fuel/air mixture for reducing exhaust emissions.

Depending upon the particular gas turbine engine model, these unburned hydrocarbons, as well as carbon monoxide, may meet the required exhaust emissions requirements. However, in a particular model of a gas turbine engine presently manufactured by the present assignee, more restrictive FAA and ICAO emissions requirements were enacted, thus requiring a change in design to reduce unburned hydrocarbon and carbon monoxide emissions to comply therewith. Inasmuch as the engine is a current production engine, it was desirable that changes be kept to a minimum within the restrictions imposed by a preexisting gas turbine engine design.

Furthermore, a combustor designed for having reduced emissions typically is limited in the amount of emissions reduction obtainable by its ability to obtain acceptable relight of the combustor at altitude when found in a gas turbine engine powering an aircraft. Therefore, reduced exhaust emissions and altitude relight capability of a combustor must be obtained together for an acceptable aircraft engine combustor.

OBJECTS OF THE INVENTION

Accordingly, it is an object of the present invention to provide a new and improved combustor for a gas turbine engine.

Another object of the present invention is to provide a new and improved combustor effective for reducing exhaust emissions.

Another object of the present invention is to provide a new and improved combustor which reduces quenching of the fuel/air mixture.

Another object of the present invention is to provide an improved combustor having improved fuel distributing means for more fully combusting air and fuel for reducing exhaust emissions.

Another object of the present invention is to provide an improved combustor having a wider fuel distribution spray pattern for increasing recirculating strength and residence time in a primary zone of the combustor for reducing exhaust emissions, and eliminate overly rich pockets of fuel from the reaction zone.

Another object of the present invention is to provide a combustor having reduced exhaust emissions with acceptable altitude relight capability.

DISCLOSURE OF INVENTION

A combustor effective for reducing exhaust emissions is disclosed. The combustor includes first and second liners defining a primary combustion zone, and a plurality of circumferentially spaced carburetors. Each of the carburetors includes a fuel injector providing fuel into an air swirler for mixing the air and fuel and providing a fuel/air mixture into the combustor primary zone. The combustor also includes means for obtaining a fuel distribution from each of the carburetors extending radially from a first liner upstream end through a center region of the combustor to a second liner upstream end with values of the fuel distribution at the center region being generally no greater than about values of the fuel distribution adjacent to at least one of the first and second liners. The first and second liners have upstream portions characterized by the absence of film cooling thereof.

BRIEF DESCRIPTION OF DRAWINGS

The novel features believed characteristic of the invention are set forth and differentiated in the claims. The invention, in accordance with Preferred and exemplary embodiments, together with further objects and advantages thereof, is more particularly described in the following detailed description taken in conjunction with the accompanying drawing in which:

FIG. 4 is a sectional, partly schematic view, of a combustor in accordance with one embodiment of the present invention.

FIG. 5 is an enlarged sectional view of a fuel injector used in the combustor illustrated in FIG. 4.

FIG. 6 is an enlarged sectional view of a carburetor in accordance with one embodiment of the present invention disposed in a dome end of the combustor illustrated in FIG. 4.

FIG. 7 is a sectional, partly schematic, view of the carburetor illustrated in FIG. 6 taken generally along line 7—7 in an upstream facing direction.

FIG. 9 is a sectional, partly schematic upstream facing view of two adjacent carburetors 76 taken generally along line 7—7 of FIG. 6.

FIG. 10 is a sectional, partly schematic view of another embodiment of a carburetor of the present invention disposed in the dome end of the combustor illustrated in FIG. 4.

FIG. 11 is a transverse, partly schematic, upstream facing view of the carburetor illustrated in FIG. 10 taken generally along line 11—11.

FIG. 13 is a sectional, partly schematic, view of a carburetor in accordance with another embodiment of the present invention disposed in the dome end of the combustor illustrated in FIG. 4.

FIG. 14 is a transverse, partly schematic, view of the carburetor illustrated in FIG. 13 taken generally along line 14—14.

MODE(S) FOR CARRYING OUT THE INVENTION

Figure 1:
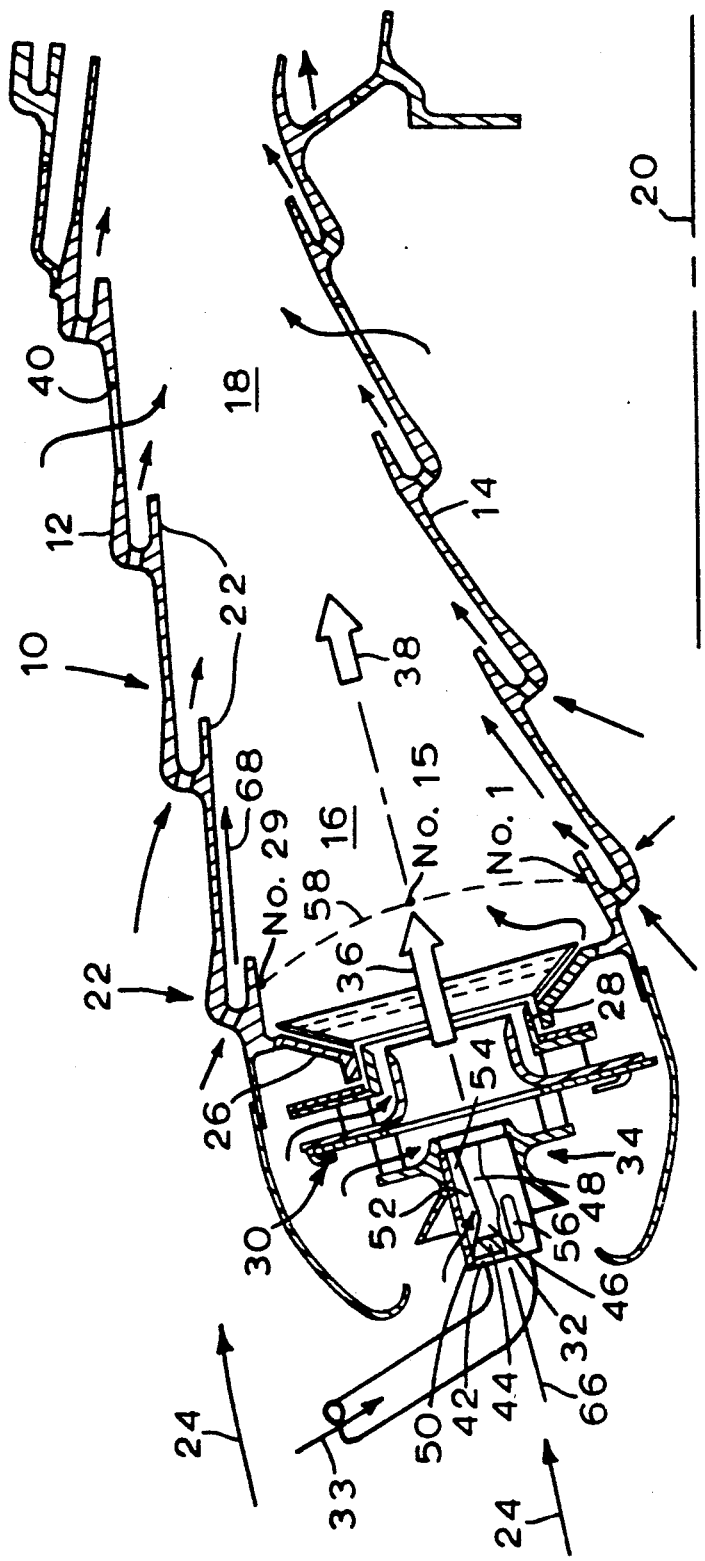
FIG. 1 is a sectional, partly schematic view of a prior art combustor for a gas turbine engine.

Illustrated in FIG. 1 is an exemplary, prior art combustor 10 for a gas turbine engine. The combustor 10 includes conventional first and second combustor liners 12 and 14 which are spaced from each other to define an annular, primary combustion zone 16 at an upstream end thereof and a dilution zone 18 extending therefrom in a downstream direction. The first and second liners 12 and 14 are disposed concentrically about an engine longitudinal centerline axis 20 and each includes conventional film cooling slots 22 which channel a portion of compressor air 24 which is conventionally channeled to the combustor 10 from a conventional compressor (not shown).

The combustor 10 also includes a conventional dome 26 having a plurality of circumferentially spaced dome apertures 28 in each of which is conventionally secured, a conventional counter-rotational swirler 30. A conventional fuel injector 32 is conventionally positioned in an upstream end of the swirler 30 for providing fuel 33 into the swirler 30 for mixing with the air 24 channeled therein. Each of the fuel injectors 32 and respective swirler 30 comprise a carburetor 34 for providing a fuel/air mixture 36 into the primary zone 16 where it is conventionally ignited and undergoes combustion. Combustion occurs primarily in the primary zone 16 at the upstream end of the combustor 10 and the resulting combustion gases 38 then flow into the dilution zone 18 wherein relatively large quantities of the air 24 flows as dilution air through conventional dilution holes 40 in the first and second liners 12 and 14 for obtaining predetermined temperature profile and distributions for being discharged from the combustor 10 into a conventional turbine nozzle and high pressure turbine (not shown).

In the exemplary combustor 10 illustrated in FIG. 1, the fuel injector 32 includes a conventional plug 42 having a plurality of tangentially inclined slots or apertures 44 for spinning the fuel 33 in a clockwise direction, for example, in a conventional spin chamber 46 and conventional boattail cone 48 extending in fluid communication downstream from the plug 42. A tubular air shroud 50 surrounds the plug 42, spin chamber 46, and cone 48 and is spaced therefrom to define a shroud chamber 52 having an annular outlet 54 at a downstream end thereof. A plurality of circumferentially spaced, oblong inlet apertures, or inlets, 56 are disposed through the shroud 50 and channel a portion of the air 24 into the shroud chamber 52 and out the shroud outlet 54.

The carburetor 34 illustrated in FIG. 1 is effective for obtaining a fuel distribution, indicated generally by the dashed line 58 in a plane extending from the second liner 14 through a center region of the primary zone 16 and to the first liner 12 at upstream ends thereof adjacent to the dome 26.

Figure 2:
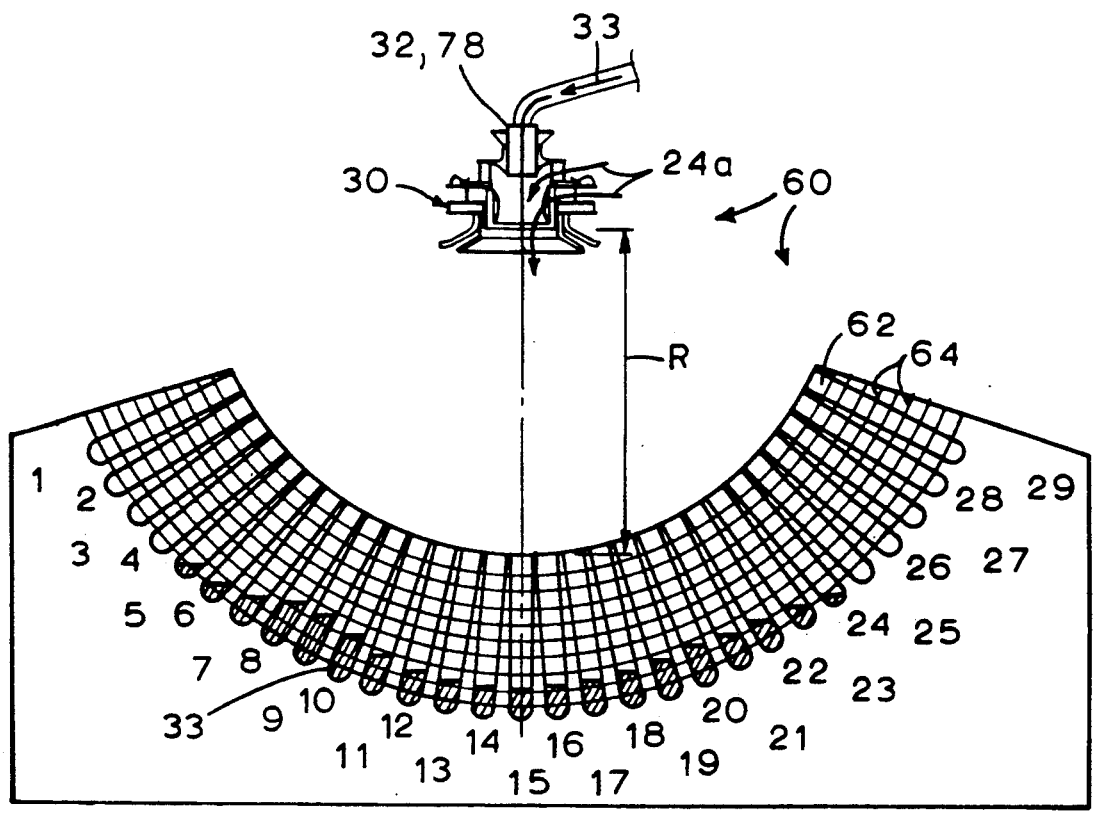
FIG. 2 is a schematic representation of a patternator assembly for measuring the fuel distribution of fuel from a carburetor for a combustor of a gas turbine engine.

Illustrated in FIG. 2 is a conventional patternator 60 which is a test assembly utilized for determining the fuel distribution 58 which is the amount of fuel discharged from the carburetor 34 along an arc of radius R measured from a carburetor, such as carburetor 34 to a plurality twenty-nine, for example, of open ended tubes 62 which collect the fuel 33 channeled through the carburetor. A plurality of graduations 64, representing concentric arcs, are associated with the tubes 62 for measuring the amount of fuel 33 collected therein. The carburetor is provided with both fuel 33 and air 24 for simulating, or testing, the operation of the carburetor in a combustor such as the combustor 10.

Figure 3:
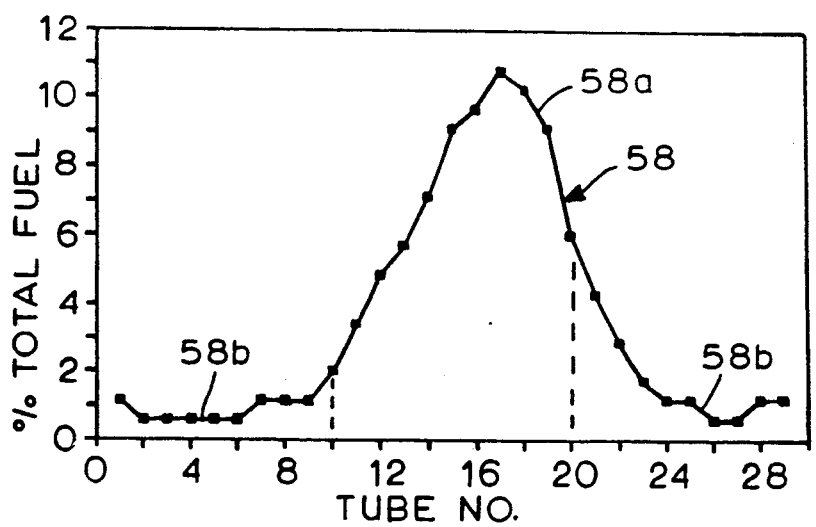
FIG. 3 is a graph plotting percent total fuel collected in patternator tubes versus tube number illustrating a prior art fuel distribution for the combustor illustrated in FIG. 1.

The results of the patternator test for the combustor 10 illustrated in FIG. 1 are disclosed in FIG. 3 which is a graph plotting the percent total fuel collected in the tubes 62 as a function of each particular tube, or tube number ranging from 1 to 29, there being 29 tubes 62 in this exemplary test. The position of the tubes in the patternator 60 is selected to evaluate carburetor performance in the combustor 10. Accordingly, the analogous position of tube No. 1 is illustrated in FIG. 1 as being at the upstream end of the second liner 14, the position of tube No. 29 is also illustrated in FIG. 1 as being at the upstream end of the first liner 12, and tube 15 is the center tube between tubes 1 and 29 and is disposed along a centerline 66 of the carburetor 34 which is also generally an annular center region of the primary zone 16. The additional tubes between tubes 1 and 15 and between 15 and 29 are equiangular spaced therebetween so that the fuel distribution from the carburetor 34 into the primary zone 16 may be evaluated.

As FIG. 3 illustrates, the fuel distribution 58 has a generally center-rich portion 58a extending generally from about tube No. 10 to about tube No. 20 which is analogous to the center region between the first and second liners 12 and 14. From that center region to the first and second liners 12 and 14 (regions 58b shown in FIG. 3), the fuel distribution 58 has a relatively fuel-lean distribution with values of about 1 to 2 percent of the total fuel collected in each of the tubes from about tube No. 1 to about tube No. 10 and from about tube No. 22 to about tube No. 29.

This prior art fuel distribution 58 is conventional for several reasons including obtaining relatively low exhaust emissions by the elimination or reduction of quenching of the fuel 33 against the relatively cool first and second liners 12 and 14 due to a relatively cool conventional film cooling boundary layer 68 provided along the inner surfaces thereof.

In accordance with the present invention, exhaust emissions can be reduced by eliminating the film cooling boundary layer 68 from the first and second liners 12 and 14 adjacent to the dome 26 in the primary zone 16 wherein most combustion actually occurs for allowing the gases immediately adjacent to liners 12 and 14 to run at higher temperatures, and then eliminating the center fuel-rich zone illustrated in FIG. 3 for obtaining a more uniform fuel distribution, and obtaining acceptable altitude relight capability. In this way, for a particular combustor size and configuration, relatively few changes may be utilized for reducing exhaust emissions without requiring a complete redesign including resizing and re-configuring the combustor. This is preferred for a production combustor to minimize changes and thereby minimize cost of improving the combustor. However, in a new engine design, the principles of the present invention may be incorporated from the initial design and optimized in accordance with the teachings of the present invention.

Illustrated in FIG. 4 is one embodiment of a combustor 70 in accordance with the present invention. Like reference numerals will refer to like elements from FIG. 1 since the FIG. 4 combustor 70, in this exemplary embodiment, is sized for the same application as the FIG. 1 combustor 10 for being a direct replacement thereof with the following changes as described hereinbelow. The combustor 70 similarly includes the first and second liners 12 and 14, the dome 26 defined therebetween, the combustion primary zone 16 followed in turn by the dilution zone 18 The first liner 12 has an upstream end 12a joined to the dome 26, and a downstream end 12b. The second liner 14 includes an upstream end 14a joined to the dome 26, and a downstream end 14b. The respective downstream ends 12b and 14b define therebetween a combustor outlet 72 which discharges the combustion gases 38 through a conventional turbine nozzle and high pressure turbine (not shown). The combustor 10 includes an annular center region 74 disposed generally equidistantly between the first and second liners 12 and 14 and is generally aligned with the axial centerlines 66 of the carburetors 34.

The combustor 70 further includes a plurality of carburetors 76 in accordance with one embodiment of the present invention, each of which includes the conventional counter-rotational swirler 30 disposed conventionally in a respective one of the dome apertures 28. Each of the carburetors 76 provides the fuel/air mixture 36 into the primary zone 16. A plurality of fuel injectors 78 are disposed in respective ones of the swirlers 30 for channeling the fuel 33 into the swirler 30 for mixing with swirler air 24a for providing the fuel/air mixture 36 into the primary zone 16. The first and second liners 12 and 14 include inner surfaces 12c and 14c, respectively, which face each other to define the primary zone 16. The inner surfaces 12c and 14c are characterized by the absence of film cooling, i.e., they do not utilize the film cooling boundary layer 68 as illustrated in the prior art FIG. 1 embodiment in the primary zone 16.

The combustor 70 further includes means for obtaining a fuel dispersion, or distribution represented by the arcuate dashed line 80 from each of the carburetors 76 extending radially from the first liner upstream end 12a through the center region 74 to the second liner upstream end 14a, which fuel distribution 80 is characterized by the absence of a fuel-rich center region 74. The fuel distribution 80 has values at the center region 74 which are generally no greater than about values of the fuel distribution 80 adjacent to at least one of the first and second liners 12 and 14.

More specifically, each of the first and second liners 12 and 14 includes an upstream portion 12d and 14d, respectively, having the inwardly facing surfaces 12c and 14c which define the primary zone 16. In this embodiment, the upstream portions 12d and 14d are the first of several liner panels which have an axial length generally equal to the length of the primary zone 16. The upstream portions 12d and 14d are imperforate from the dome 26 to the downstream end of the primary zone 16. By being imperforate, the upstream portions 12d and 14d do not allow any cooling air to be channeled along the inner surfaces 12c and 14c, respectively, for eliminating the film cooling boundary layer 68 as utilized in the prior art combustor illustrated in FIG. 1.

However, means 82 for impingement cooling the liner upstream portions 12d and 14d are provided to maintain metal temperatures comparable to that obtained by film cooling. The upstream portions 12d and 14d include outer surfaces 12e and 14e, respectively, which face oppositely to the inner surfaces 12c and 14c, respectively, and an impingement shield 84 having a plurality of impingement apertures 86 therein is suitably attached to the liners 12 and 14 and spaced from the outer surfaces 12e and 14e, respectively. The apertures 86 provide a portion of the air 24 in impingement against the outer surfaces 12e and 14e for cooling the liner upstream portions 12d and 14d. The air used for impingement is then channeled through a conventional film cooling slot 22 at the downstream ends of the upstream liner portions 12d and 14d to provide film cooling of the next succeeding liner panel disposed downstream therefrom. The conventional dilution apertures 40 are provided in the liners 12 and 14 for providing dilution air into the dilution zone 18 as in conventionally known.

Since film cooling is not provided for the liner upstream portions 12d and 14d, additional means for protecting those portions from the combustion occurring int eh primary zone 16 may include the use of a conventional thermal barrier coating 88 on the inner surface 12c and 14c. This provides an additional emissions benefit by providing a higher surface temperature in contact with the reaction zone for a given base metal temperature. An exemplary thermal barrier coating 88 that may be used is yttrium zirconia. The thermal barrier coating 88 may also be applied at each of the conventional film cooling slots 22 at downstream ends thereof if desired.

Three embodiments of the means for distributing fuel for obtaining the preferred fuel distribution 80 are disclosed hereinbelow. In all of the embodiments, the fuel injector 78, as illustrated for example in FIG. 5, includes the conventional plug 42 having the tangentially inclined slots 44 for swirling the fuel 33. The injector also includes the annular spin chamber 46 and the boattail cone 48 extending in turn downstream from the plug 42. The plug 42, spin chamber 46, and boattail cone 48 are effective for swirling the fuel 33 in a generally clockwise direction about the centerline 66, facing in an upstream direction, as illustrated in FIG. 5.

A first embodiment is illustrated in FIGS. 6 and 7 and includes an annular shroud 90 spaced radially outwardly from the spin chamber 46 and the boattail cone 48 to define an annular shroud chamber 92 having an annular outlet 94. The shroud 90 further includes a plurality of circumferentially spaced inlet apertures 96 extending through the shroud 90 in flow communication with the shroud chamber 92 for providing a portion of the air 24 into the shroud chamber 92. The inlets 96 and the outlet 94 are predeterminedly sized for reducing an axial component of velocity of the air 24 channeled through the shroud chamber 92 for increasing radially outward dispersion of the fuel 33 from the boattail cone 48 of the injector 78 into the swirler 30. In the preferred embodiment, each of the shroud inlets 96 has an oblong cross section, such as that shown for the inlets 56 illustrated in FIG. 1, with a maximum dimension disposed parallel to the centerline axis 66 of the carburetor 76, which is also the centerline of the injector 78 and the swirler 30.

FIG. 7 illustrates schematically an upstream facing view of the carburetor 76 illustrated in FIG. 6 taken generally along line 7—7 showing some of the elements of the carburetor 76. The shroud inlets 96 are inclined at about 20-30° from a radial axis extending outwardly from the centerline 66 or, alternatively, at an angle A of about 60-70° from a tangent to the shroud 96, which angle A is the complement of the angle relative to the radial axis. By this arrangement, each of the shroud inlets 96 is inclined relative to the radial axis for spinning the air channeled through the shroud chamber 92 for reducing the axial component of velocity of the air 24 being discharged from the chamber outlet 94. More specifically by spinning the air 24 in the shroud chamber 92, when the air is discharged from the outlet 94 it will have circumferential components which tend to move the air radially outwardly from the centerline 66. In the prior art injector 32 illustrated in FIG. 1, air from its shroud chamber outlet 54 is discharged in an axial direction which confines the fuel 33 from the cone 48 for assisting and providing the fuel-rich center region. By reducing or eliminating the axial component of the air 24 channeled from the shroud outlet 94, the fuel 33 discharged from the cone 48 is allowed to disperse radially outwardly for obtaining a more uniform fuel distribution.

Again referring to FIG. 6 and 7, the conventional swirler 30 includes a tubular ferrule 98 in which is slideably positioned the shroud 90 of the fuel injector 78 so that substantially no air is channeled therebetween. The swirler 30 further includes an annular primary venturi 100 and a plurality of circumferentially spaced swirler primary vanes 102 extending between the ferrule 98 and the primary venturi 100. A secondary venturi 104 is disposed downstream in part and radially outwardly of the primary venturi 100, and a plurality of circumferentially spaced swirler secondary vanes 106 extend between the primary and secondary venturis 100 and 104. The secondary venturi 104 is spaced radially outwardly from the primary venturi for allowing a portion of the air 24 to be channeled from the secondary vanes 106 and through the secondary venturi 104.

As illustrated in FIG. 6, the primary and secondary vanes 102 and 106 extend generally in a radial direction for channeling portions of the air 24 radially inwardly relative to the centerline axis 66. The primary and secondary venturis 100 and 104 are disposed generally parallel to the centerline axis 66 for turning the air channeled through the primary and secondary vanes 102 and 106 and discharging that air from the carburetor 76 initially in a generally axial direction parallel to the centerline axis 66 but by virtue of the angular momentum imparted by the swirlers, turns to a direction radially outward from the centerline axis upon exiting the combustor.

The swirler 30 is a counter-rotational swirler because the primary vanes 102 are configured for swirling the air 24 in opposite direction to the air swirled by the secondary vanes 106 as illustrated more particularly in FIG. 7. The primary vanes 102 (only two of which are shown) are illustrated schematically and are effective for swirling the air 24 in a clockwise direction and circumferentially around the centerline axis 66 in the primary venturi 100. The secondary vanes 106 (only two of which are shown) are also illustrated schematically and are configured for swirling the air 24 in a counterclockwise direction relative to the centerline axis 66 in the secondary venturi 104, which is opposite to the direction of the swirled air in the primary venturi 100.

FIG. 9 illustrates an upstream facing view of two adjacent carburetors 76. An arcuate portion of the center region 74 of the combustor 10 is illustrated which is a ring coaxial about the engine centerline 20 and extending generally through the centers of the fuel injectors 78 (i.e., through the centerlines 66). Also illustrated is the fuel distribution plane, or arc, 80 extending in a radial direction generally perpendicularly to the center region 74 and through the center of the carburetor 76. Tube No. locations 1, 15, and 29 are illustrated in FIG. 9 for a point of reference in addition to that illustrated in FIG. 4.

In a preferred embodiment, the shroud inlets 96 are inclined generally similarly to the inclination of the primary vanes 102 for swirling, or rotating, the portion of the air channeled through the shroud outlet 94 in the same direction as the air channeled and swirled through the primary venturi 100, which in this embodiment is in a clockwise direction. In this way, the swirling effect of the air through the shroud outlet 94 and of the air through the primary venturi 100 assist each other in dispersing the air with the fuel 33 in a radially outward direction upon discharge from the carburetor 76 for obtaining a more uniform fuel distribution.

Figure 8:
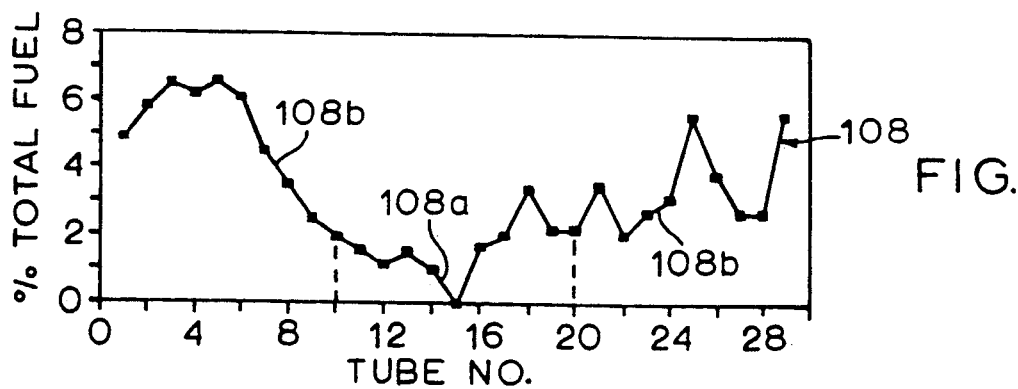
FIG. 8 is graph plotting percent total fuel collected in patternator tubes versus tube number showing a fuel distribution for the carburetor illustrated in FIG. 6.

The patternator 60 illustrated in FIG. 2 used for the carburetor 76 illustrated in FIG. 6 results in the fuel distribution 108 illustrated in the FIG. 8 graph. The amount of air channeled through the shroud inlets 96 represents about 3 percent of the total air 24 channeled to the combustor 10 which is the same as the amount of air channeled through the shroud inlets 56 in the prior art embodiment illustrated in FIGS. 1 and 3. However, due to the inclined shroud inlets 96 in accordance with this embodiment of the present invention, the fuel-rich center region illustrated in the FIG. 3 fuel distribution 58 has been eliminated in the FIG. 8 graph associated with the embodiment of the invention illustrated in FIGS. 6 and 7. The fuel distribution 108 adjacent to and at the center region 74 (i.e., region 108a in FIG. 8) shows values of about 0 to about 4 percent of the total fuel flow for tube Nos. between about 10 and 20 associated generally with the center region 74. From the center region outwardly to tube positions 1 and 29 (i.e., regions 108b) the fuel distribution 108 increases in value with maximum values occurring generally adjacent to the first and second liners 12 and 14.

Illustrated in FIGS. 10 and 11 is another embodiment of the present invention wherein the means for distributing fuel comprises instead of the inclined elongated shroud inlets 96 illustrated in FIGS. 6, relatively small, circular shroud inlets 110 spaced circumferentially around and through the shroud 90. The inlets 110 are not inclined but aligned in a radially outward direction and are sized for throttling the air 24 channeled therethrough, and the air 24 channeled the shroud chamber 92 is metered by the shroud inlets 110 only.

More specifically, in the prior art fuel injector 32 illustrated in FIG. 1, the air 24 entering the shroud inlets 96 is metered by the shroud outlet 54. In other words, the inlets 56 are relatively large for having relatively small pressure drop, and the shroud outlet 54 is relatively small for providing a predetermined pressure drop, i.e., for throttling the air 24, which in the embodiment illustrated in FIG. 1 results in a significant axial component of velocity of the air 24 discharged from the outlet 94. In the FIG. 9 embodiment of the invention, the shroud outlet 112 and the shroud inlets 110 are predeterminedly sized so that throttling occurs across the inlets 110, and the outlet 112 is relatively large with relatively small pressure drop thereacross. In this way, the axial component of velocity of the air 24 discharged from the shroud outlet 112 is reduced. FIG. 11, which is generally similar to FIG. 7, illustrates a portion of the air 24 channeled radially inwardly through the shroud inlets 110 and the counter-rotating air swirled by the primary and secondary vanes 102 and 106 being channeled through the primary and secondary venturis 100 and 104 respectively.

Figure 12:
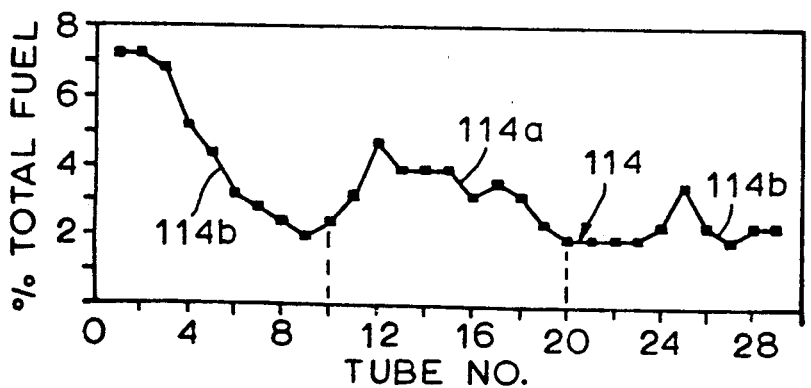
FIG. 12 is a graph plotting percent total fuel collected in patternator tubes versus patternator tube number illustrating a fuel distribution for the carburetor illustrated in FIG. 10.

Illustrated in FIG. 12 is a fuel distribution 114 associated with the embodiment of the invention illustrated in FIGS. 10 and 11 resulting from testing using the patternator 60 illustrated in FIG. 2. In this embodiment, the amount of air 24 channeled through the shroud inlets 110 represents about 1.5 percent of the total air 24 channeled to the combustor 10. The fuel distribution 114 has a center region 114a indicated generally between tube Nos. 10 and 20 having values of fuel distribution less than the fuel distribution values in the region 114b represented by tubes from No. 1 to No. 10 adjacent to the second liner 14. The value of the fuel distribution 114 at the center region 114a associated with center region 74 of FIG. 4 is generally uniform.

Illustrated in FIGS. 13 and 14 is another, preferred, embodiment of the present invention wherein the fuel distribution means instead of having either the shroud inlets 96 of the FIG. 6 embodiment or the shroud inlets 110 of the FIG. 10 embodiment, has no inlets and is imperforate. In this embodiment of the invention, no portion of the air 24 is allowed to flow through the shroud 90, into the shroud chamber 92 or out of the shroud outlet 94. In this way, no air 24 is channeled from the shroud 90 around the fuel discharged from the boattail cone 48 which would otherwise partially confine the fuel 33.

In the FIG. 1 embodiment of the prior art, a portion of the air 24 was channeled through the shroud chamber 52 for assisting in cooling the injector 32 for preventing coking thereof. However, in accordance with one feature of the present invention, the elimination of the shroud air allows for a more uniform fuel distribution as indicated by fuel distribution 116 illustrated in FIG. 15 for a test of the FIG. 10 embodiment of the invention utilizing the patternator 60 of FIG. 2. Without the shroud air, coking of the fuel injector 78 may occur but is offset by the advantages due to the present invention. In this embodiment, the fuel injector 78 and the swirler 30 are sized and configured for dispersing the fuel 33 from the injector boattail cone 48 toward the primary venturi 100, and the primary and secondary venturis 100 and 104 are effective for swirling the fuel with the air 24 from the primary and secondary vanes 102 and 106 for dispersing the fuel 33 radially outwardly for obtaining the fuel distribution 116.

Figure 15:
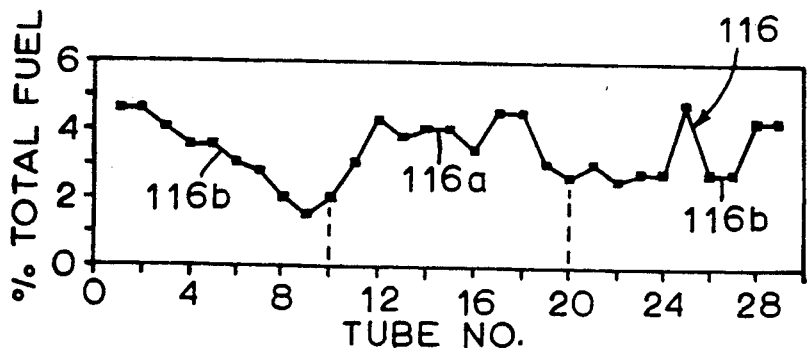
FIG. 15 is a graph plotting percent total fuel collected in patternator tubes versus patternator tube number plotting the fuel distribution for the carburetor illustrated in FIG. 13.

The FIG. 15 graph plotting the fuel distribution 116 for the embodiment of the invention illustrated in FIG. 13 shows a generally uniform fuel distribution from tube No. 1 through tube No. 29. This represents generally uniform fuel distribution from the first liner upstream end 12a to the center region 74 and to the second liner upstream end 14a analogous to regions 116a and 116b in FIG. 15. The fuel distribution 116 is generally uniform to plus or minus 2 percent of the total fuel collected in the twenty-nine tubes of the patternator 60.

In all of the above embodiments, having the objective of obtaining a more uniform fuel distribution from the carburetors 76, those skilled in the art, from the teachings herein, can size and configure the fuel injector 78 and the swirler 30 for obtaining the generally wide spray pattern, or fuel distributions as indicated in FIG. 8, 12, and 15 for obtaining a general uniform fuel distribution and eliminating the fuel-rich center region found in the prior art, illustrated for example in FIG. 3. This preferred fuel distribution in conjunction with the upstream liner portions 12d and 14d being utilized without film cooling thereof results in reduced exhaust emissions as supported by test results which meet the relevant FAA and ICAO requirements.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A combustor for a gas turbine engine comprising:
   a first liner having an upstream end and a downstream end;
   a second liner having an upstream end and a downstream end and spaced from said first liner to define a combustor primary zone adjacent to said upstream end, a dilution zone adjacent to said downstream end, and an annular center region disposed between said first and second liners;

an annular dome jointed to said first and second liner upstream ends and including a plurality of circumferentially spaced apertures;

a plurality of carburetors disposed in respective ones of said dome apertures for providing a fuel/air mixture into said primary zone, each of said carburetors including:

a swirler disposed in a respective one of said dome apertures for swirling and channeling air; and a fuel injector disposed in said swirler for channeling fuel into said swirler for mixing with said swirler air for providing said fuel/air mixture into said primary zone;

said first and second liners having inner surfaces facing each other to define said primary zone, said inner surfaces being characterized by the absence of film cooling; and means for distributing fuel for obtaining a fuel distribution from each of said carburetors extending radially from said first liner upstream end through said center region to said second liner upstream end and having values of said fuel distribution at said center region generally no greater than about values of said fuel distribution adjacent to at least one of said first and second liners.

2. A combustor according to claim 1 wherein said first and second liners each include an upstream portion defining said primary zone and a downstream portion defining said dilution zone, and said upstream liner portions are imperforate.

3. A combustor according to claim 2 wherein said inner surfaces of said upstream liner portions include a thermal barrier coating.

4. A combustor according to claim 2 wherein said first and second liner upstream portions include outer surfaces facing away from said inner surfaces, and further including means for impingement cooling said outer surfaces of said first and second liner upstream portions.

5. A combustor according to claim 1 wherein said fuel distribution means comprises said fuel injector including:

a spin chamber for providing fuel into said swirler; and a spin chamber for providing fuel into said swirler; and an annular shroud spaced from said spin chamber to define a shroud chamber having an outlet, and including a plurality of circumferentially spaced inlets extending through said shroud for channeling air into said shroud chamber, said inlets and said outlet being sized for reducing an axial component of velocity of said air channeled through said shroud chamber outlet for increasing radially outward dispersion of said fuel discharged from said injector into said swirler.

6. A combustor according to claim 5 wherein said swirler is a counter-rotational swirler.

7. A combustor according to claim 5 wherein said shroud inlets are sized for throttling said air channeled therethrough and said air channeled through said shroud chamber is metered by said shroud inlets only.

8. A combustor according to claim 5 wherein said fuel injector has an axial centerline axis, and each of said shroud inlets is inclined relative to a radial axis extending from said injector centerline axis for spinning said air channeled through said shroud chamber for reducing said air axial component of velocity.

9. A combustor according to claim 8 wherein said shroud inlets are inclined at about 20°-30° from said radial axis.

10. A combustor according to claim 9 wherein each of said shroud inlets has an oblong cross section with a maximum dimension disposed parallel to said injector centerline axis.

11. A combustor according to claim 1 wherein said fuel distributing means comprises:

said swirler including:

a tubular ferrule;

a primary venturi;

a plurality of circumferentially spaced swirler primary vanes extending between said ferrule and said primary venturi;

a secondary venturi;

a plurality of circumferentially spaced swirler secondary vanes extending between said primary and secondary venturis; and said secondary venturi being spaced radially outwardly of said primary venturi;

said fuel injector including a spin chamber, and a cone extending therefrom for providing fuel into said swirler, and an imperforate annular shroud, having no air inlets, disposed around said spin chamber and positioned slideably in said swirler ferrule so that no air flows through said shroud and substantially no air is channeled between said shroud and said ferrule; and said injector and said swirler being sized and configured for dispersing fuel form said injector cone toward said primary venturi, and said primary and secondary venturis being effective for swirling said fuel with said air form said primary and secondary vanes for dispersing said fuel radially outwardly.

12. A combustor according to claim 11 wherein said primary and secondary vanes extend radially for channeling and swirling said air radially inwardly.

13. A combustor according to claim 12 wherein said primary vanes are configured for swirling said air in an opposite direction to said air swirled by said secondary vanes.

14. A combustor according to claim 12 wherein said fuel injector has an axial centerline axis and said primary and secondary venturis are disposed generally parallel to said injector centerline axis.

15. A combustor according to claim 12 wherein said injector and swirler are sized and configured for obtaining a generally uniform fuel distribution.

16. A combustor according to claim 12 wherein said first and second liners each include an upstream portion defining said primary zone and a downstream portion defining said dilution zone and said upstream liner portions are imperforate.

17. A combustor according to claim 16 wherein said first and second liner upstream portions include outer surfaces facing away from said inner surfaces, and further including means for impingement cooling said outer surfaces of said first and second liner upstream portions, and said inner surfaces of said upstream portions include a thermal barrier coating.

18. A combustor for a gas turbine engine comprising:

a first liner having an upstream end and a downstream end;

a second liner having an upstream end and a downstream end and spaced from said first liner to define a combustion primary zone adjacent to said upstream end, a dilution zone adjacent to said downstream end, and an annular center region disposed between said first and second liners;

an annular dome joined to said first and second liner upstream ends and including a plurality of circumferentially spaced apertures;

a plurality of carburetors disposed in respective ones of said dome apertures for providing an fuel/air mixture into said primary zone, each of said carburetors including:

a swirler disposed in a respective one of said dome apertures for swirling and channeling air; and a fuel injector disposed in said swirler for channeling fuel into said swirler for mixing with said swirler air for providing said fuel/air mixture into said primary zone;

said first and second liners having inner surfaces facing each other to define said primary zone, said inner surfaces being characterized by the absence of film cooling; and means for distributing fuel for obtaining a fuel distribution from each of said carburetors extending radially from said first liner upstream end through said center region to said second liner upstream end and having values of said fuel distribution at said center region generally no greater than about values of said fuel distribution adjacent to at least one of said first and second liners, said fuel distribution means comprising said fuel injector including:

a spin chamber for providing fuel into said swirler; and an annular shroud spaced from said spin chamber to define a shroud chamber having an outlet, and including a plurality of circumferentially spaced inlets extending through said shroud for channeling air into said shroud chamber, said inlets and said outlet being sized for reducing an axial component of velocity of said air channeled through said shroud chamber outlet for increasing radially outward dispersion of said fuel discharged form said injector into said swirler.

19. A combustor according to claim 18 wherein said shroud inlets are sized for throttling said air channeled therethrough; said air channeled through said shroud chamber is metered by said shroud inlets only; and wherein said shroud inlets are disposed in a radial direction.

20. A combustor for a gas turbine engine comprising:
a first liner having an upstream end and a downstream end;
a second liner having an upstream end and a downstream end and spaced from said first liner to define a combustion primary zone adjacent to said upstream end, a dilution zone adjacent to said downstream end, and an annular center region disposed between said first and second liners;
an annular dome joined to said first and second liner upstream ends and including a plurality of circumferentially spaced apertures;
a plurality of carburetors disposed in respective ones of said dome apertures for providing an fuel/air mixture into said primary zone, each of said carburetors including:
a swirler disposed in a respective one of said dome apertures for swirling and channeling air; and a fuel injector disposed in said swirler for channeling fuel into said swirler for mixing with said swirler air for providing said fuel/air mixture into said primary;

said first and second liners having inner surfaces facing each other to define said primary zone, said inner surfaces being characterized by the absence of film cooling; and means for distributing fuel for obtaining a fuel distribution from each of said carburetors extending radially from said first liner upstream end through said center region to said second liner upstream end and having values of said fuel distribution at said center region generally no greater than about values of said fuel distribution adjacent to at least one of said first and second liners, said fuel distribution means comprising said fuel injector including:

a spin chamber for providing fuel into said swirler; and an annular shroud spaced from said spin chamber to define a shroud chamber having an outlet, and including a plurality of circumferentially spaced inlets extending through said shroud for channeling air into said shroud chamber; said fuel injector having an axial centerline axis, and each of said shroud inlets inclined relative to a radial axis extending from said injector centerline axis for spinning said air channeled through said shroud chamber; said inlets and said outlet being sized for reducing an axial component of velocity of said air channeled through said shroud chamber outlet for increasing radially outward dispersion of said fuel discharged from said injector into said swirler.

21. A combustor according to claim 20 wherein said shroud inlets are inclined at about 20°–30° from said radial axis.

22. A combustor according to claim 21 wherein each of said shroud inlets has an oblong cross section with a maximum dimension disposed parallel to said injector centerline axis.

23. A combustor for a gas turbine engine comprising:
a first liner having an upstream end and a downstream end;
a second liner having an upstream end and a downstream end and spaced from said first liner to define a combustion primary zone adjacent to said upstream end, a dilution zone adjacent to said downstream end, and an annular center region disposed between said first and second liners;
an annular dome joined to said first and second liner upstream ends and including a plurality of circumferentially spaced apertures;
a plurality of carburetors disposed in respective ones of said dome apertures for providing an fuel/air mixture into said primary zone, each of said carburetors including:
a swirler disposed in a respective one of said dome apertures for swirling and channeling air; and
a fuel injector disposed in said swirler for channeling fuel into said swirler for mixing with said swirler air for providing said fuel/air mixture into said primary zone;
said first and second liners having inner surfaces facing each other to define said primary zone, said inner surfaces being characterized by the absence of film cooling; and means for distributing fuel for obtaining a fuel distribution from each of said carburetors extending radially from said first liner upstream end through said center region to said second liner upstream end and having values of said fuel distribution at said center region generally no greater than about values of said fuel distribution adjacent to at least one of said first and second liners, said fuel distribution means comprises:

said swirler including:
- a tubular ferrule;
- a primary venturi;
- a plurality of circumferentially spaced swirler primary vanes extending between said ferrule and said primary venturi;
- a secondary venturi;
- a plurality of circumferentially spaced swirler secondary vanes extending between said primary and secondary venturis; and
- said secondary venturi being spaced radially outwardly of said primary venturi;

said fuel injector including a spin chamber, and a cone extending therefrom for providing fuel into said swirler, and an imperforate annular shroud, having no air inlets, disposed around said spin chamber and positioned slideably in said swirler ferrule so that no air flows through said shroud and substantially no air is channeled between said shroud and said ferrule; and said injector and said swirler being sized and configured for dispersing fuel form said injector cone toward said primary venturi, and said primary and secondary venturis being effective for swirling said fuel with said air from said primary and secondary vanes for dispersing said fuel radially outwardly.

24. A combustor according to claim 23 wherein said primary and secondary vanes extend radially for channeling and swirling said air radially inwardly, said primary vanes are configured for swirling said air in an opposite direction to said air swirled by said secondary vanes, and said fuel injector has an axial centerline axis, and said primary and secondary venturis are disposed generally parallel to said injector centerline axis.

25. A combustor according to claim 24 wherein said injector and swirler are sized and configured for obtaining a generally uniform fuel distribution.

* * * * *